United States Patent [19]

Godard et al.

[11] 4,025,861
[45] May 24, 1977

[54] METHOD AND DEVICE FOR CHARGING AND HEATING AT LOW TEMPERATURE A SEALED STORAGE CELL BATTERY

[75] Inventors: Pierre Godard, Tremblay les Gonesse; Claude Prevot, Paris, both of France

[73] Assignee: Saft-Societe des Accumulateurs Fixes et de Traction, Romainville, France

[22] Filed: July 29, 1975

[21] Appl. No.: 599,965

[30] Foreign Application Priority Data

Aug. 23, 1974 France .............................. 74.28971

[52] U.S. Cl. .................................. 320/23; 320/32; 320/35; 320/39
[51] Int. Cl.² ......................................... H02J 7/00
[58] Field of Search .................. 320/23, 24, 35, 36, 320/39, 40, 2, 5, 22, 32, 33

[56] References Cited

UNITED STATES PATENTS

| | | | |
|---|---|---|---|
| 3,440,515 | 4/1969 | Swartz | 320/24 |
| 3,740,636 | 6/1973 | Hogrefe et al. | 320/35 X |

*Primary Examiner*—Robert J. Hickey
*Attorney, Agent, or Firm*—Kenyon & Kenyon Reilly Carr & Chapin

[57] ABSTRACT

Method for charging a sealed storage cell battery according to which the battery is heated when its temperature lies below a determined value and the intensity of the charge current is lowered by being shunted to heat the battery when the voltage of the battery reaches a given value, characterized in that the said value of the voltage of the battery supplies the signal which causes the heating of the battery; and device for implementing the method.

11 Claims, 2 Drawing Figures

METHOD AND DEVICE FOR CHARGING AND HEATING AT LOW TEMPERATURE A SEALED STORAGE CELL BATTERY

The present invention concerns a method and device for charging at low temperature a sealed storage cell battery, applicable more particularly to the cases of alkaline storage cells of the nickel-cadmium or silver-cadmium type.

The following specification refers to a storage battery to be charged. It is quite evident that the number of storage cells in this battery can be any number and that it can even be equal to 1 and conversely, the following considerations apply as well to the charging of several batteries, for examlpe series connected, as to the charging of a single battery.

It is known that in a sealed storage cell the speed of consumption of the electrolysis products which are evolved off at the end of the charge and during overcharge depends mainly on the speed of diffusion of these products within the electrolyte, whether they migrate from the compartment of the polarity in which they are evolved to the compartment of opposite polarity, or whether they pass through a gaseous phase and must be redissolved in the electroltye for that consumption. At low temperature, that diffusion is considerably slowed down and, moreover, subsequent to the increase in the internal resistance of the storage cell, due to the lowering of the temperature, the voltage of water electrolysis decomposition is reached more rapidly. Consequently, the permissible currents at the end of charge and during overcharge decrease when the temperature of the storage cell becomes lower than 0° C.

When it is necessary to ensure the recharge of a battery of that type in a very wide temperature range, the charges at low temperature allow only one alternative:

Decreasing the current by lengthening the duration of the charge;

Heating the battery to enable it to absorb an unchanged charge current.

In the latter case, the heating of the battery can be effected from the outside, by insertion in a heating enclosure, or from the inside by applying to it an alternating current. The control of the starting and stopping of the heating is normally ensured by a thermostat, which also controls the charging when the required temperature is reached.

If the battery has small dimensions and the heating enclosure has a slight volume, or if the coating of the battery is a poor heat conductor, the use of a thermostat becomes difficult.

Indeed, besides the problem of the space necessary for accomodating the thermostat, the internal temperature of the storage cells is not easily transmitted to the outer surface of the coating and thermostatic controlling becomes very inaccurate. Also, there is a danger of damage by insufficient heating.

The device according to the invention enables, simultaneously, accurate control of the heating circuit and reliable protection of the storage cells.

An object of the invention is a method for charging a sealed storage battery according to which the battery is heated when its temperature is situated below a determined value and the intensity of the charge current is lowered when the battery voltage reaches a given predetermined and fixed value, characterized in that the said value of the voltage of the battery supplies the signal which starts the heating of the battery.

According to a preferred embodiment, the reduction in the charge current is obtained by shunting it and the control of the heating device is obtained by the intensity of the shunted current.

To great advantage, the shunted charge current is either completely or partly used for heating the storage cells.

The invention also has as its object a device for carrying out the above method and comprising a circuit delivering a constant current connected in series with the said storage battery and a heating circuit for the battery characterized in that a shunt circuit for the charge current is connected in parallel with the battery, means depending on a predetermined and fixed value of the battery voltage causing the passing of all or a part of the charge current in the shunt circuit and energizing the heating circuit of the battery.

According to an advantageous embodiment means which are sensitive to the intensity of the shunted current control the energizing of the heating circuit of the battery.

Preferably, the circuit shunting the current contributes to the heating of the battery.

The invention will be better understood from the following description of an example of embodiment of the invention, illustrated by the accompanying drawing, in which.

Figure 1:
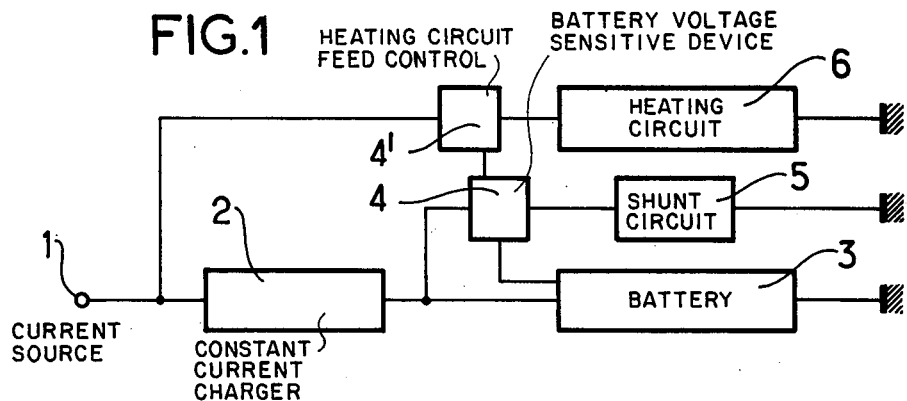
FIG. 1 shows a block diagram of a device according to the invention.

In FIG. 1 a source of current 1, not shown, feeds a constant current charger 2 which charges the battery 3. A device 4 sensitive to the battery voltage allows the current to pass in the shunt circuit 5 when the voltage of the battery 3 sensed by said device 4 reaches a certain predetermined and fixed value which depends both on its state of charge and on the temperature. The device 4' controls the feeding of the heating circuit 6, either under the effect of the same value of the battery voltage as that which enabled the shunting of a part the charge current of the battery in the circuit 5, or, preferably, by using, for controlling the feeding of 6, the value of the intensity passing in the circuit 5.

Figure 2:
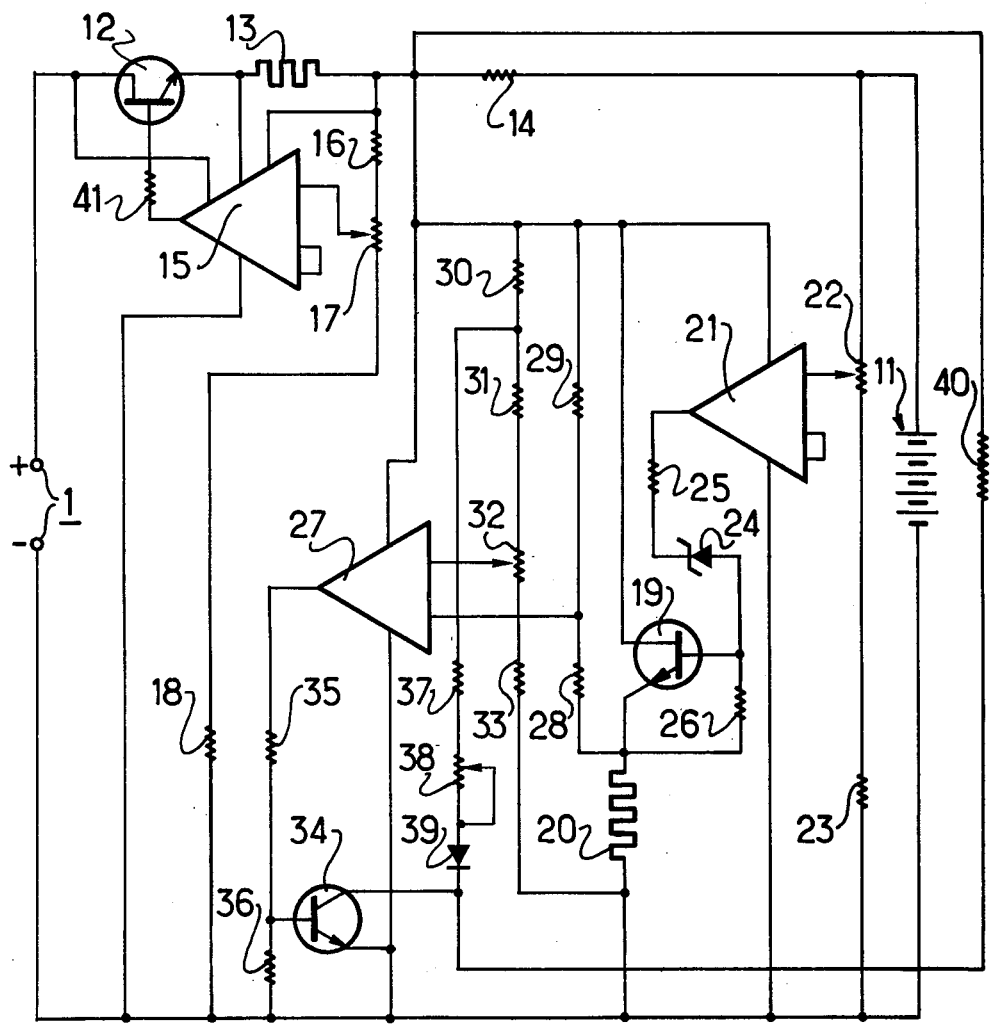
FIG. 2 shows diagrammatically a wiring of the electric circuits according to the invention.

FIG. 2 shows the wiring diagram of an example of the device according to the invention.

That device comprises:

A circuit delivering a constant current or a constant voltage source followed by a resistance, connected in series between the source and the battery to be charged and which represents the charger 2 in FIG. 1;

A current shunting circuit in parallel with the battery to be charged, which can absorb all or a part of the current if the battery voltage tends to increase and which corresponds to the circuits 4 and 5 in FIG. 1;

A current sensor having two thresholds which ensures the starting and the stopping of the main heating circuit and which corresponds to the circuit 4' in FIG. 1;

A heating circuit which corresponds to the circuit 6 in FIG. 1.

FIG. 2 shows a direct current source 1 feeding all the circuits as a whole and whose negative pole is directly connected to the negative pole of the battery 11.

The current delivered by the source is made constant by a voltage regulator followed by a resistance 14, situated on the positive side of the battery 11. The regulator is constituted by a power transistor 12 whose emitter-collector junction is in series with the battery.

The feed voltage is regulated by an integrated regulator or amplifier 15 with an internal reference which receives a voltage drawn off from the voltage divider consituted by the resistors 16 and 18 and the potentiometer 17, which is compared with the internal reference. The voltage delivered by the amplifier 15 is applied by means of the resistor 41 to the base of the transistor 12, this ensuring the regulating of the input voltage. A low resistance value resistor 13 through which the feed current passes supplies to the amplifier 15 a data which enables the limitation of the said current.

The circuit shunting the current at the terminals of the battery comprises the emitter-collector junction of the power transistor 19 and a resistor 20 having a low resistance. The transistor 19 is controlled by an integrated regulating amplifier 21 of the same type as 15 having an incorporated reference source. The base of the transistor 19 is connected to the output of the regulator amplifier 21 by the resistor 25 and the Zener diode 24. The Zener diode 24 is intended to enable the voltage regulator amplifier 21 to operate in its normal operating range. A resistor 26 closes the base-emitter circuit of the transistor 19. The integrated regulator amplifier receives a voltage proportional to the battery voltage supplied by the voltage divider comprising the potentiometer 22 and the resistor 23 at the terminals of the battery. As long as the voltage supplied by the divider 22–23 to the integrated regulator amplifier 21 is less than the determined reference voltage of that amplifier 21, the transistor 19 is not conductive and the whole of the current supplied by the source 1 passes through the battery. When the battery voltage across and becomes such that the voltage supplied by the divider 22–23 to the integrated amplifier 21 reaches and exceeds the value of the reference voltage of the amplifier 21, the transistor 19 is polarized and becomes conductive. Then a part of the current supplied by the source is shunted across resistor 20 and transistor 19 and no longer passes into the battery 11. The charge current of the battery thus decreases in such a way that the battery voltage then remains substantially constant.

The detecting of the current passing in the shunt circuit is effected by the integrated operational amplifier 27 which receives the voltage at the terminals of the resistor 20 through two voltage dividers, the one composed by the resistors 30, 31 and 33 and by the potentiometer 32 and the other composed by the resistors 28 and 29. That amplifier 27 is connected through the resistor 35, to the base of a transistor 34 whose emitter-collector junction forms a part of the heating circuit otherwise represented by the heating resistor 40. The resistor 36 closes the emitter-base circuit. When the voltage at the terminals of the resistor 20 reaches a value determined by the setting of the potentiometer 32, the amplifier 27 polarizes the transistor 34 which becomes conductive and the heating resistor 40 is energized. But on the other hand, the collector of 34 is connected to the common point between the resistors 30 and 31 through the resistor 37, the potentiometer 38 and the one-way diode 39. The current which passes through the resistor 30 is therefore increased by the current which passes through 37, 38, 39 and 34.

The result of this is that if the current passing through the resistor 20 decreases, the value which it should reach for the transistor 34 to become blocked is lower than the value for which the transistor 34 became conductive. That value can be adjusted by the potentiometer 38. The interrruption of the heating will be effected for an intensity of the shunted current lower than the intensity which puts the heating resistor 40 into service.

It should be observed that inasmuch as concerns the thermal arrangements, it is advantageous to put the radiator of the transistor 19 in contact with the heating enclosure, this making it possible to add the heat given off in the circuit by the passing of the shunted current to the heat given off by the resistor 40.

The charging of a battery at low temperature can be effected in two ways:

1. The battery is completely discharged.

a. At the beginning of the charge, the battery voltage remains less than the required value across the voltage divider 22–23 to polarize transisotr 19 and allow passage of shunt current through resistor 20 and transistor 19 and the battery is charged by a constant current.

After a time which varies as a function of the temperature, the battery voltage rises and reaches the required value across the divider 22–23. The shunt circuit starts then is energized and the shunter current increases as the charging progresses. The heating comes into action.

b. The shunted current continues to increase until the battery temperature is sufficiently high; it remains at a constant level, then decreases.

When the shunted current becomes low, the heating is stopped. It is started again if the battery temperature decreases.

2. The battery is discharged only of a small part of its capacity.

The required voltage across the divider 22–23 to render the shunt circuit conductive is reached from the outset and the heating operates as described in 1) b).

During charge, when the temperature of the battery is greater than 0° C, the battery voltage never reaches the limit value necessary across the divider 22–23 to render the shunt circuit conductive and the current shunting circuit and, consequently the heating circuit, remain inactive.

By way of an example, for a sealed nickel-cadmium storage battery, charged by a current of about C/7, this corresponding to a charge in 10 hours and where the end of charge voltage at an average temperature of 20° C is of about 1.40 to 1.45 volts, provision is made for a required limit voltage of 1.55 volts per storage cell for the starting up of the shunting of the charge current and of the heating of the battery. That limit value of the voltage is such that the device operates at temperatures lower that 0° C.

It must be understood that the hereinbefore described example does not limit the scope of the invention in any way. More particularly, certain means described can be replaced by equivalent means without however departing from the field of the invention. Thus, the regulation of the current could be obtained by a regulator of intensity with a direct current source similar to that in the example. That direct current source could be replaced by a rectified alternating current source where the current regulation would be obtained by a series connected inductor before the rectifier or any other regulating system. Likewise, the control circuit of the shunted current could be replaced by an equivalent circuit such as an amplifier with an external reference, etc.

The invention therefore contemplates variations within the scope of the appended claims. There is no intention of limitation to the exact disclosure herein presented.

We claim:

1. Method for charging a sealed storage battery according to which the battery is heated when its temperature is situated below a determined value and the intensity of the charge current to the battery is reduced by shunting part thereof when the battery voltage reaches a predetermined given value which is selected such that it can be attained as a battery voltage only when the battery temperature is at 0° C or lower and whose value is higher than end of charge voltage of the battery at average 20° C temperature, characterized in that the said value of the battery voltage supplies the signal which starts said shunting to effect the heating of the battery.

2. Method for charging according to claim 1, characterized in that said reduction in the charge current to the battery is obtained by shunting of part of the charge current and control of battery heating is effected by the intensity of the shunted current.

3. Method for charging according to claim 2, characterized in that the said shunted part of said charge current is used for effecting at least partly the heating of the battery.

4. Method for charging a sealed storage battery comprising the steps of supplying charge current to said battery, providing a shunt circuit for said charge current, heating said battery with charge current and at least in part by current in said shunt circuit when the internal temperature of said battery lies below a predetermined value, sensing battery voltage and effecting shunting of charge current into said circuit and thereby lowering the intensity of the charge current supplied to the battery when the battery voltage attains a predetermined given value which is selected such that it can be attained as a battery voltage only when the temperature of the battery is at 0° C or lower and whose value is higher than end of charge voltage of the battery at average 20° C temperature, and utilizing the said predetermined battery voltage value to cause said shunting of charge current into said shunt circuit and utilizing the intensity of the shunted current to control the internal heating of said battery.

5. Method for charging a sealed storage battery according to claim 4 characterized in that shunting of any of said charge current into said shunt circuit effects lowering of the intensity of charge current to said battery and controlling the extent of heating of said battery by the intensity of the shunted charge current.

6. Method for charging a sealed storage battery according to claim 5 wherein said shunted charge current serves to effect at least partly the heating of said battery.

7. A battery charging system for a sealed storage battery comprising means for supplying a direct charging current connected in series to said storage battery, heating means for said battery, a shunt circuit for said charging current connected in parallel with said battery and means dependent upon a predetermined battery voltage occurring at 0° C or lower for effecting shunting of charging current into said shunt circuit, means for effecting energization of said heating means for said battery with charging current controlled by intensity of shunted current in said shunt circuit, and means sensitive to the intensity of shunted charging current flowing in the shunt circuit to control energization of said battery heating means including means for energizing said heating means for a given value of intensity of the shunted charging current flowing in the shunt circuit and for deenergizing said heating means when said intensity is lower than said given value.

8. A battery charging system for a sealed storage battery according to claim 7 wherein said shunted charging current is at least partially used to heat said battery.

9. A battery charging device for a sealed storage battery comprising a current charger connected in series with the battery, a shunt circuit and a battery voltage sensitive means connected in parallel across said battery, a heating circuit for the battery and a current sensor means with two thresholds connected in parallel across said charger and battery, said sensor means also being connected to said voltage sensitive means, said battery voltage sensitive means being responsive to battery voltage to shunt charge current into said shunt circuit when said voltage reaches a given value and said current sensor means being responsive to intensity of current shunted into said shunt circuit when the internal temperature of the battery lies below a given value to effect flow of heating current in said heating circuit and to cut off flow of heating current in said heating circuit above said last-named value.

10. A battery charging device for a sealed storage battery according to claim 9 including a heating resistor in said heating circuit and wherein said shunt circuit becomes heated upon passage of shunted current therethrough, and means to add the heat then occurring in said shunt circuit to the heat provided by said heating resistor when heating current flows through said resistor.

11. A battery charging device for a sealed storage battery according to claim 9 including means for regulating input voltage to said current charger.

* * * * *